(12) United States Patent
Harris

(10) Patent No.: US 8,263,167 B2
(45) Date of Patent: Sep. 11, 2012

(54) SORGHUM ANTIOXIDANT FOOD PRODUCT

(76) Inventor: Robert Harris, Englewood, NJ (US)

(*) Notice: Subject to any disclaimer, the term of this patent is extended or adjusted under 35 U.S.C. 154(b) by 205 days.

(21) Appl. No.: 12/642,208

(22) Filed: Dec. 18, 2009

(65) Prior Publication Data

US 2011/0151090 A1    Jun. 23, 2011

(51) Int. Cl.
*A23L 1/00* (2006.01)

(52) U.S. Cl. ........................... 426/618; 426/549

(58) Field of Classification Search ............... 426/618; 3/618
See application file for complete search history.

(56) References Cited

U.S. PATENT DOCUMENTS 4,491,483 A * 1/1985 Dudacek et al. ............. 127/33
2007/0141218 A1 * 6/2007 Chatel et al. ................. 426/549

OTHER PUBLICATIONS

Dykes: Phenolic Compounds and Antioxidant Activity of Sorghum Grains of Varying Genotypes; J. Agric. Food Chem. 2005, 53, 6813-6818; published on web Aug. 2, 2005.*

Austin: The Effects of Sorghum [Sorghum Bicolor (L.) Moench] Phenolic Compounds on Starch Digestibility of Porridges; A Dissertation of Texas A&M University; Major Subject: Food Science and Technology; Dec. 2008.*

Larson: An Evaluation of New Market Development and Marketing Strategies on Sorghum and Millet Farmers' Income in Tanzania and Zambia; Project OSU 200: Ohio State University; published 2007; published online Aug. 7, 2008: Wayback confirmed: http://wayback.archive.org/web/*/http://intsormil.org/SM2007anlrpt/2007CUTILM.pdf.*

Nutrient Dat. Lab. et al., "Oxygen radical absorbance capacity (ORAC) of selected foods—2007", U.S.Dept. of Agriculture Agricultural Research Service, Nov. 2007, 34pp.

* cited by examiner

*Primary Examiner* — Patricia George
(74) *Attorney, Agent, or Firm* — Husch Blackwell LLP

(57) ABSTRACT

The present invention is related to processes for the manufacture of a cereal product having an improved anti-oxidant content with high ORAC values and the product thereof. In addition, the present invention relates to a method of using this product to increase the anti-oxidant levels of a mammal. The milled grain may then be ground into flour which is then used to make the product desired. Particularly high ORAC values result from the use of a specific type of sorghum that contains high levels of tannin. The high tannin level sorghum is milled and ground and placed into formulations in at least partial substitution for the wheat or oat grain, to result in content of high tannin sorghum bran of 3-10% and whole grain high tannin sorghum of 50-60%.

7 Claims, No Drawings

SORGHUM ANTIOXIDANT FOOD PRODUCT

TECHNICAL FIELD

The present invention is related to processes for the manufacture of a food product having an improved antioxidant content and the product thereof.

The object of the present invention a method is to manufacture a food product having an improved antioxidant content and the product thereof.

BACKGROUND OF THE INVENTION

Sorghum is primarily grown as animal feed in the US. Sorghum and rice are used generally for this purpose.

Nutritionists and health professionals recommend eating whole grains, natural fiber, vegetables, fruits and low fat dairy products. Whole grains give one some natural fiber and important nutrients, while fruits and vegetables also provide critical fiber with a whole variety of antioxidants which are believed to help maintain good health, combat inflammation, neutralize damaging free radicals in our bodies and make other essential contributions to well being.

One benefit of the subject invention is thus to have a cereal product, primarily a sorghum flour, having a high content of antioxidant.

A measure of antioxidant capacity of foodstuffs is its Oxygen Radical Absorbance Capacity (ORAC). The correlation between the high antioxidant capacity of fruits and vegetables, and the positive impact of diets high in fruits and vegetables, in part due to the high antioxidant capacity of fruits and vegetables, is believed to play an important role in free radical theory of aging.

Sorghum is also gluten free in contrast to other grains such as wheat or oats. Fiber is also present in sorghum bran and sorghum whole grain. Fiber, antioxidants and lack of gluten, combined with its relatively bland taste make sorghum desirable for use in consumer foods, such as breakfast cereal, bread, pancake mix and others. Further, when high tannin sorghum is used in such consumer foods, the antioxidant activity is increased commensurate with the increase of the ORAC values.

SUMMARY OF THE INVENTION

In the practice of the subject invention, the high tannin sorghum grain is milled and the bran is separated conventionally, unless whole grain sorghum is desired. The milled grain may then be ground into flour which is then used to make the prepared food product desired.

Particularly high ORAC values result from the use of a specific type of sorghum that contains high levels of tannin. The high tannin sorghum variety also aids in weight loss. Thus the high tannin level sorghum is milled and ground and placed into formulations of various food products in substitution for wheat or oat grain, to result in a content of high tannin sorghum bran of 2-15% preferably 5-10% and whole grain high tannin sorghum of 40-70% preferably 55-60%. Preparing food products with sorghum causes an increase in the ORAC levels of these food products and ingestion of such food products by a mammal then causes a concomitant increase in the antioxidant level within the mammal.

DETAILED DESCRIPTION OF THE PRESENT INVENTION

High tannin sorghum grain is utilized to provide a high antioxidant food product with high ORAC values. The sorghum can be used as either whole grain or bran, as desired, and is milled and ground accordingly. The grain or bran is first cooked at 250° F. for 45-60 minutes, formed into a pellet and then dried at 200° F. for 15 minutes. In this stage one drying, the high tannin sorghum pellet is reduced to a moisture content of 24% to 34%. The high tannin sorghum pellet is then tempered for 20 minutes and sent to the roll mills where they are pinched between two rolls to form a flake. The high tannin flake then goes to a second stage of drying at 350-375° F. for one minute. To make a high tannin flour, the high tannin flakes may be comminuted to a desired particle size. This results in a flake or flour with a high ORAC value.

The high tannin sorghum flake as flour is then incorporated in partial or full substitution for wheat or oat flour in various foodstuffs, such as bread, pancake mix, waffle mix, pasta, crackers, muffins and the like as set forth below.

EXAMPLE 1

Breakfast Cereal

Whole grain, high tannin sorghum is prepared by cooking the high tannin sorghum 250° F. After tempering for 20 minutes, the grain is rolled and formed into flakes which may then be served as breakfast cereal. Ingestion of these flakes with sweetening and fruits as desired results in high anti-oxidant levels in a human or other mammal. The addition of the high tannin sorghum flour provides the foodstuff with a higher ORAC value and more fiber.

EXAMPLE 2

Corn Flakes

A corn dough is prepared with milled corn, sugar, flavoring, vitamins and minerals and high fructose corn syrups. 25% of the corn is substituted with high tannin sorghum. The dough is allowed to set for 2-4 hours and then pressed through rollers. The result is a high tannin sorghum corn flake with high ORAC values and fiber. The addition of the high tannin sorghum flour provides the foodstuff with a higher ORAC value and more fiber.

EXAMPLE 3

Wheat Flakes

The procedure of Example 2 is followed with the exception that wheat and/or wheat bran is used to prepare the dough, being partly substituted (25%) with the high tannin sorghum. The result is a high tannin sorghum wheat flake with high ORAC values and fiber.

Other cereals, such as oats or oat blends (granules) and brans may also be prepared in the same manner. The addition of the high tannin sorghum flour provides the foodstuff with a higher ORAC value and more fiber.

EXAMPLE 4

Muffins

Ingredients
2 eggs
1 cup of flour
2 cups of high tannin sorghum flour
1 cup of sugar
½ cup of milk ¼ cup of butter
2 teaspoons of baking powder
1 teaspoon of vanilla
½ teaspoon of salt
Procedure Preheat oven to 350° F. Grease and flour muffin pan. Beat together the butter, eggs, salt and sugar. Mix the flour with baking powder and sift into first mixture, alternating with milk. Blend in the vanilla. Pour into the muffin pan and bake for about thirty minutes. For a gluten free product, 3 cups of high tannin sorghum flour are used, with no wheat flour.

The result is a high tannin sorghum muffin with high ORAC values and, when ingested by a mammal, higher antioxidant levels in the mammal. The addition of the high tannin sorghum flour provides the foodstuff with a higher ORAC value and more fiber.

EXAMPLE 5

Pancakes

Ingredients
½ cup of wheat flour
1 cup high tannin sorghum flour
3½ teaspoons baking powder
1 teaspoon salt
1 tablespoon white sugar
1¼ cups milk
1 egg
3 tablespoons butter, melted
Procedure In a large bowl, sift together the flour, baking powder, salt and sugar. Make a well in the center and pour in milk, egg and melted butter; mix until smooth. For a gluten free product, the wheat flour is substituted with an equal amount of high tannin sorghum flour. The addition of the high tannin sorghum flour provides the foodstuff with a higher ORAC value and more fiber.

EXAMPLE 6

Corn Muffins

Ingredients
1½ cups flour
½ cup cornmeal
½ cup high tannin sorghum
1 cup water
¼ cup shortening
¼ cup sugar
2 tablespoons of vinegar
1 teaspoon of salt
Procedure Mix shortening and sugar; then add cornstarch, vinegar and salt. Mix all of the remaining ingredients, pour into a greased muffin tin. Bake at 400° F. (200° C.) for 20 minutes. The addition of the High Tannin Sorghum flour provides the foodstuff with a higher ORAC value and more fiber.

EXAMPLE 7

Brownies

Ingredients
¾ cup butter, melted
1½ cups white sugar
1½ teaspoons vanilla extract
3 eggs
⅜ cup of wheat flour
⅜ cup high tannin sorghum flour
½ cup unsweetened cocoa powder
½ teaspoon baking powder
½ teaspoon salt
Procedure Preheat oven to 350° F. (175° C.). Grease an 8 inch square pan. Blend melted butter, sugar and vanilla. Beat in eggs. Combine the flour, cocoa, baking powder and salt. Blend into the egg mixture. Spread the batter into a pan. Bake in oven for 40-45 minutes, or until brownies begin to pull away from the sides of the pan. Let cool. The addition of the high tannin sorghum flour provides the foodstuff with a higher ORAC value and more fiber.

EXAMPLE 8

Cake

Ingredients
½ cup wheat flour
2 cups sugar
2 cups cold water
⅔ cup vegetable oil
½ cup unsweetened cocoa powder
2 teaspoons baking powder
2 teaspoons white vinegar
1 teaspoon salt
1 teaspoon vanilla
Procedure Heat oven to 350° F. Combine and mix all ingredients. Pour batter in a greased 9×13×2 inch pan. Bake 35 minutes. The addition of the high tannin sorghum flour provides the foodstuff with a higher ORAC value and more fiber.

EXAMPLE 9

Wheat Bread

Ingredients
3 cups warm water (110° F. or 45° C.)
2 (¼ ounce) packages dry yeast
⅓ cup honey
5 cups wheat flour
3 tablespoons butter, melted
⅓ cup honey
1 tablespoon salt
3½ cups high tannin sorghum flour
2 tablespoons butter, melted
Procedure Mix warm water, yeast and ⅓ cup honey. Add 5 cups wheat flour, and stir. Let set for about 30 minutes. Mix in 3 tablespoons melted butter, ⅓ cup honey and salt. Mix in 2 cups high tannin sorghum flour. Flour a flat surface and knead with high tannin sorghum flour until not too sticky. This may take an additional 2 to 4 cups of sorghum flour. Place in a greased bowl, coating the surface of the dough. Cover. Let rise.

Punch down and divide into three loaves. Place in greased 9×5 inch loaf pans and allow to rise until dough has topped the pans by one inch.

Bake at 350° F. (175° C.) for 25 to 30 minutes. Lightly brush the tops of loaves with 2 tablespoons melted butter or margarine when done to prevent crust from getting hard. Cool completely. The addition of the high tannin sorghum flour provides the foodstuff with a higher ORAC value and more fiber.

EXAMPLE 10

Pasta Sauce

Ingredients
3 tablespoons extra virgin olive oil
1 large onion, chopped
2 cloves garlic, crushed
2 (14.5 ounce) cans tomatoes, chopped
¼ teaspoon red pepper flakes, to taste
2 teaspoons balsamic vinegar
2 teaspoons white sugar
¾ cup basil leaves, torn into pieces
salt and ground black pepper to taste
½ cup high tannin sorghum flour
Procedure
Heat olive oil over medium heat; cook the onion and garlic in the hot oil about 5 minutes. Mix the tomatoes, red pepper flakes, vinegar, and sugar into the onion and garlic mixture; boil and simmer 45 to 60 minutes. Mix basil into the sauce; season with salt and pepper. The addition of the high tannin sorghum flour provides the foodstuff with a higher ORAC value and more fiber.

EXAMPLE 11

Salad Dressing

Raspberry Wine Vinaigrette

Ingredients
12 ounces raspberry puree
1 cup raspberry vinegar
1 and ½ cups canola oil
lemon juice from one lemon
salt and black pepper to taste
¼ cup high tannin sorghum flour
Procedure
Mix the raspberry puree and raspberry vinegar. Slowly add in the oil and continue mixing for about 1 minute, then mix in lemon juice. The addition of the high tannin sorghum flour provides the foodstuff with a higher ORAC value and more fiber.

EXAMPLE 12

Fudge Sauce

Ingredients
2 cups white sugar
1 cup brown sugar
1 cup cocoa
2 tablespoons wheat flour
2 tablespoons high tannin sorghum flour
¼ cup butter
1 and ½ cups water
½ teaspoon salt
½ teaspoon vanilla
Procedure
Mix dry ingredients. Add butter and water to the mixed ingredients. Bring to a boil. Continue boiling for about 10 minutes. Remove from heat and add vanilla. The addition of the high tannin sorghum flour provides the foodstuff with a higher ORAC value and more fiber.

Should less sorghum be desired while maintaining the same beneficial effects of high tannin sorghum flour, then a diminished amount of high tannin sorghum bran may be used in any of the above examples.

Other food items may also include high tannin sorghum to provide a healthy food product, such as snack items. For instance corn chips, potato chips and extruded snacks, such as corn puffs and the like may benefit from the inclusion of high tannin sorghum flour. By adding high tannin sorghum to these snack items, not only is the ORAC value improved, but the fiber content is increased as well.

In other embodiments of the subject invention, Table I shows the ORAC values of the various food products with High Tannin Sorghum added:

| Product | ORAC value (µmol TE/100 g) |
|---|---|
| Muffin Mix | 11,800 |
| Pancake Mix | 10,000 |
| Bran Flakes | 8,800 |
| Toasted Oats | 7,300 |
| Crackers | 4,100 |

In Table II is shown published ORAC values for standard food and precuts (without High Tannin Sorghum added) as determined by USDA 2007:

| Product | ORAC (µmol TE/100 g) |
|---|---|
| Toasted oat meal | 2,086 |
| Shredded Wheat | 1,222 |
| Almonds | 4,282 |
| Peanut butter | 3,127 |
| Banana | 813 |

Having thus described several aspects of at least one embodiment of this invention, it is to be appreciated various alterations, modifications and improvements will readily occur to those skilled in the art. Such alterations, modifications and improvements are intended to be part of this disclosure, and are intended to be within the spirit and scope of the invention. Accordingly, the foregoing description and drawings are by way of example only.

What is claimed is:

1. A prepared food product for humans having a sorghum grain content consisting of:
2-15% high tannin sorghum bran and 40-70% high tannin sorghum wholegrain, said prepared food product having an ORAC value of about 4100 micomole TE/100g to 11800 micromole TE/100g, wherein the high tannin sorghum bran and wholegrain are selected from types of high tannin sorghums that provide the ORAC value of the food product.

2. The prepared food product of claim 1 comprising a food product selected from the group consisting of baked goods, sauces, pastas and cereals.

3. The prepared food product of claim 1 comprising breakfast cereal, bread, pancake mix, waffle mix, pasta, pasta sauce, crackers, muffins, fudge sauce and brownies.

4. A method of increasing anti-oxidant levels in a human, comprising:
preparing a food product having a sorghum grain content consisting of whole grain high tannin sorghum and high tannin sorghum bran and
mixing sufficient whole grain high tannin sorghum and high tannin sorghum bran to have an ORAC value of about 4100 micomole TE/100R to 11800 micomole TE/100g, wherein the high tannin sorghum wholegrain and bran are selected from types of high tannin sorghums that provide the ORAC value of the food product.

5. The method of claim 4 wherein the food product is selected from the group consisting of baked goods, sauces, pasta and cereals.

6. The method of claim 4 wherein the food product is breakfast cereal, bread, pancake mix waffle mix, pasta, pasta sauce, crackers, muffins, fudge sauce and brownies.

7. A prepared food product comprising 2-15% high tannin sorghum bran and a whole grain, wherein the food products has an ORAC value of about 4100 micomole TE/100g to 11800 micomole TE/100g, and the high tannin sorghum bran and wholegrain are from types of high tannin sorghums that provide the ORAC value of the food product.

* * * * *